United States Patent
Buchko

(10) Patent No.: US 6,889,491 B2
(45) Date of Patent: May 10, 2005

(54) MAGNETIC ATTACHMENT OF A BED KNIFE IN A REEL MOWER ASSEMBLY

(75) Inventor: Jeff Buchko, Regina (CA)

(73) Assignee: Suncaddy Canada Inc. (CA)

( * ) Notice: Subject to any disclaimer, the term of this patent is extended or adjusted under 35 U.S.C. 154(b) by 0 days.

(21) Appl. No.: 10/201,841

(22) Filed: Jul. 24, 2002

(65) Prior Publication Data

US 2003/0226344 A1 Dec. 11, 2003

(30) Foreign Application Priority Data

Jun. 7, 2002 (CA) .............................................. 2389770
Jul. 18, 2002 (CA) .............................................. 2394085

(51) Int. Cl.⁷ .............................................. A01D 34/42
(52) U.S. Cl. .................................. 56/249; 56/DIG. 20
(58) Field of Search ................ 403/DIG. 1; 83/698.11, 83/698.21; 56/16.7, 249, 249.5, 250, 294, DIG. 17, DIG. 20, 6, 7

(56) References Cited

U.S. PATENT DOCUMENTS

| | | | | |
|---|---|---|---|---|
| 3,337,100 A | * | 8/1967 | Berning ...................... | 224/182 |
| 3,350,045 A | * | 10/1967 | Mayers ..................... | 248/205.3 |
| 3,782,166 A | * | 1/1974 | Whistler et al. ............... | 72/462 |
| 4,195,542 A | * | 4/1980 | Zimmer ........................ | 83/664 |
| 4,233,873 A | * | 11/1980 | Jessen .......................... | 83/652 |
| 5,291,724 A | * | 3/1994 | Cotton ......................... | 56/251 |
| 5,379,671 A | * | 1/1995 | Kang ....................... | 83/698.11 |
| 5,477,666 A | * | 12/1995 | Cotton ......................... | 56/251 |
| 5,979,150 A | * | 11/1999 | Klingler .................... | 56/10.2 J |
| 6,044,637 A | * | 4/2000 | Thier et al. ................... | 56/249 |
| 6,318,059 B1 | * | 11/2001 | Cotton ......................... | 56/251 |
| 2003/0000195 A1 | * | 1/2003 | Watkins ..................... | 56/320.1 |

FOREIGN PATENT DOCUMENTS

FR 2597933 * 10/1987

* cited by examiner

Primary Examiner—Thomas B. Will
Assistant Examiner—Nathan Mammen
(74) Attorney, Agent, or Firm—Harness, Dickey & Pierce, P.L.C.

(57) ABSTRACT

A reel mower assembly comprises a mower reel rotatably mounted to a frame, and a drive operative to rotate the reel about a reel axis. A plurality of magnets are mounted on the frame and a bed knife is magnetically held against the magnets in an operating position such that the bed knife is oriented in cutting relationship with the reel. When the bed knife is in an operating position, sliding movement of the bed knife with respect to the magnets while allowing the bed knife to move away from the magnets may be prevented, when a separating force is exerted on the bed knife in a direction away from the magnets that is greater than an attractive force exerted on the bed knife by the magnets.

33 Claims, 3 Drawing Sheets

MAGNETIC ATTACHMENT OF A BED KNIFE IN A REEL MOWER ASSEMBLY

This invention generally relates to improved reel mower assemblies and reel mower units incorporating such assemblies. More specifically, it relates to an alternative attachment of the bed knife to the mower reel assembly which reduces maintenance costs.

BACKGROUND

Reel mowers use a scissoring action to shear grass and like foliage, rather than caring the leaves. Such reel mowers are more expensive and require more maintenance than rotary mowers, however they are preferred by golf courses and the like where appearance and healthy grass are important. Individual reel mower assemblies are quite narrow, and consequently reel mower units commonly comprise a plurality of side-by-side reel mower assemblies.

Examples of such mowers are disclosed in U.S. Pat. Nos. 5,291,724, 5,477,666 and 6,318,059. In a typical reel mower assembly, an attachment member, commonly called a bed bar; is attached to the apparatus in rigid relationship to the reel, and a replaceable bed knife is attached to the bed bar. The reel, bed bar and bed knife are oriented such that the bed knife is held parallel to the reel axis and in close proximity to the reel knives so that a shearing action is achieved between the reel knives and the bed knife. Typically an adjustment mechanism is provided to allow movement of the bed bar relative to the reel so that the bed knife can be moved into proper relationship with the rotating reel knives.

Conventionally, the bed knife is attached to the bed bar with a plurality of screws placed through holes in the bed knife and engaging threaded holes in the bed bar. Typically ten or more screws are used. Changing the bed knife requires that these screws be removed, and then replaced. Typically the bed knife is attached to the underside of the bed bar so that the apparatus must be raised sufficiently, or partially dis-assembled, to allow access to the underside of the reel mower assembly to remove the screws and the bed knife. A reel-mower unit such as is used by a golf course or the like may comprise eight or ten individual reel mower assembly, and changing bed knives on such a mower unit requires significant labor time and corresponding downtime.

As well, the screws fix the bed knife to the bed bar such that when a stone or similar debris enters the mower, it can jam between the fixed bed knife and the reel, causing damage to one or more portions of the apparatus. Similarly should the bed knife contact a substantially buried obstruction, the bed knife can be damaged as it bounces over the obstruction. While the bed knife can simply be replaced, damage to the reel is generally much more costly and problematic, given the close tolerances required for proper operation.

SUMMARY OF THE INVENTION

It is the object of the present invention to provide an improved reel mower assembly, and an improved bed knife that can be attached to existing reel mower assemblies, that allows for quick changing of the bed knife with significantly reduced labor and is downtime compared to the prior art.

In a first aspect the invention provides a reel mower assembly comprising a mower reel rotatably mounted to a frame, and a drive operative to rotate the reel about a reel axis. At least one magnet is mounted on the frame and a bed knife is magnetically held against the magnet in an operating position such that the bed knife is oriented in cutting relationship with the reel. Engagement means are operative to prevent sliding movement of the bed knife with respect to the magnet while allowing the bed knife to move away from the magnet when a separating force is exerted on the bed knife in a direction away from the magnet that is greater than an attractive force exerted on the bed knife by the magnet when the bed knife is in the operating position.

In a second aspect the invention provides an apparatus adapted for attachment to a reel mower assembly comprising a mower reel rotatably mounted to a frame and a drive operative to rotate the reel about a reel axis. The apparatus comprises abed bar adapted for attachment to the frame substantially parallel to the reel axis and a plurality of magnets mounted on the bed bar. A bed knife is magnetically held against the magnets in an operating position such that the bed knife is oriented in cutting relationship with the reel when the bed bar is attached to the frame. Engagement means are operative to prevent sliding movement of the bed knife with respect to the magnets while allowing the bed knife to move away from the magnets when a separating force is exerted on the bed knife in a direction away from the magnets that is greater than an attractive force exerted on the bed knife by the magnets when the bed knife is in the operating position.

The engagement means can comprises protrusions extending from one of the frame and bed knife into corresponding recesses in the other of the frame and bed knife. Alternatively ridges could be formed on the frame such that the ridges bear against the front edge and side edges of the bed knife. Such ridges would prevent rearward or sideways movement, leaving the front cutting edge open and in cutting relationship to the reel. Little forward directed force will ordinarily be encountered by the bed knife in such a reel mower assembly, and such forward force could be resisted by the magnets. The protrusions and recesses have the advantage of resisting sliding forces forward, rearward or sideways. Both ridges and protrusions allow a separating force to be exerted on the bed knife to overcome the magnetic force holding the bed knife to the magnets in order to remove the bed knife.

In a third aspect the invention provides, in a reel mower assembly comprising a mower reel rotatably mounted to a frame and a drive operative to rotate the reel about a reel axis, a method of holding a bed knife in an operating position such that the bed knife is oriented in cutting relationship with the reel. The method comprises mounting at least one magnet on the frame, magnetically holding the bed knife against the magnet in the operating position, and preventing sliding movement of the bed knife with respect to the magnet while allowing the bed knife to move away from is the magnet when a separating force is exerted on the bed knife in a direction away from the magnet that is greater than an attractive force exerted on the bed knife by the magnet when the bed knife is in the operating position.

Commercial grade magnets are available of sufficient strength such that when they are built into the supporting frame for the bed knife, typically on a frame portion called the bed bar, they will hold the bed knife in the operating position resisting considerable separating forces that might be encountered by the bed knife in operation. The engagement means prevents sliding movement of the bed knife with respect to the bed bar in response to the rearward force of the reel pulling grass against the forward edge of the bed knife, or in response to sideways forces during turns. The engagement means aligns the bed knife in the proper operating position When the bed knife and bed bar are clean, the bed knife can be readily maneuvered into engagement with the protrusions, ridges or the like and will then snap into place in response to the force of the magnets.

The magnetic attachment of the bed knife to the frame has numerous advantages over the mechanical or screw attachment of the prior art. The magnetic attachment results in a quick change assembly where the bed knife can basically be changed by prying it away from the magnets and attaching another bed knife to the magnets in its place without the need to disassemble the reel mower assembly from the remainder of the reel mower unit to access the screws holding the bed knife in place.

The present invention yields a relatively "tool-less" bed knife changing operation. The only tool required to remove a bed knife from the frame would be a blade or the like to pry the items apart. The strength of the magnets and number of magnets used in the frame to hold the bed knife in place could be adjusted or varied depending on the circumstances.

The magnetic attachment also reduces maintenance costs by allowing the bed knife to be pulled away from its magnetic attachment and released from the bed bar when an obstruction such as a rock or the like is encountered. Damage to the reel and bed knife is thereby reduced.

While permanent magnets will likely be most widely suited, electromagnets could also be used to hold the bed knife in place. Where electromagnets are used, it would be even easier to release the blade from the frame, since by deactivation of the electromagnets the blades could easily be removed therefrom.

In addition to manufacturing a completed new reel apparatus in accordance with the present invention, a retrofit bed bar and bed knife could also be designed in accordance with the present invention to be retrofitted onto various existing reel mower units.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
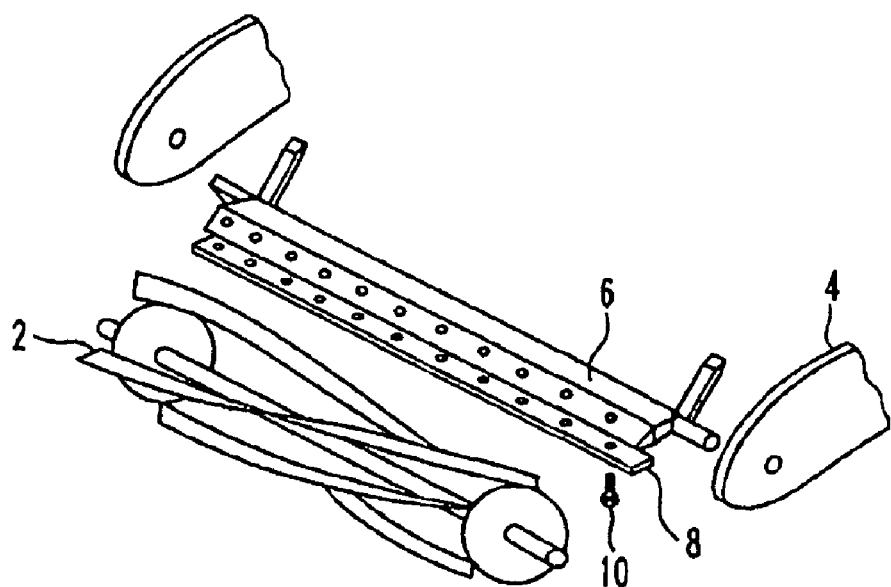
FIG. 1 is an exploded perspective view showing a reel mower assembly and typical bedknife mounting assembly of the prior art.
Figure 2:
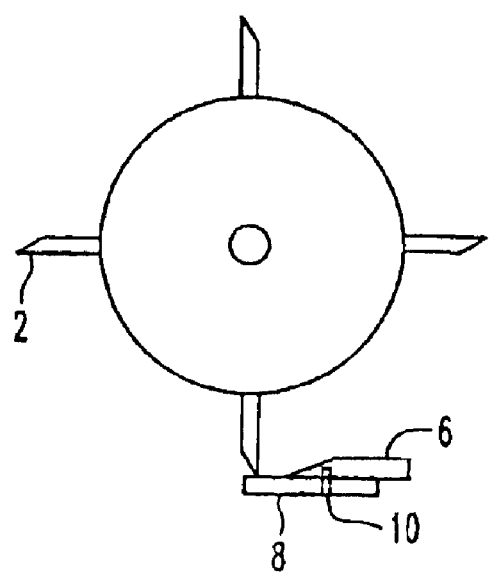
FIG. 2 is a schematic side view showing the reel and bedknife mounting arrangement of the prior art reel mower assembly of FIG. 1.

FIG. 1 schematically illustrates the major parts of a prior art reel mower assembly comprising a mower reel 2 rotatably mounted to a frame 4. A drive, not shown, is operative to rotate the reel 2 about a reel axis RA. A bed bar 6 forms a portion of the frame 4, and the bed knife 8 is attached to the bed bar 6 by screws 10. Typically some adjustment mechanism, not shown, is provided to vary the position of the bed bar 6 with respect to the reel 2 so that the proper cutting relationship between the bed knife 8 and reel 2 may be achieved. FIG. 2 illustrates schematically the orientation of the reel 2, the bed bar 6, and the bed knife 8 of the prior art.

Figure 3:
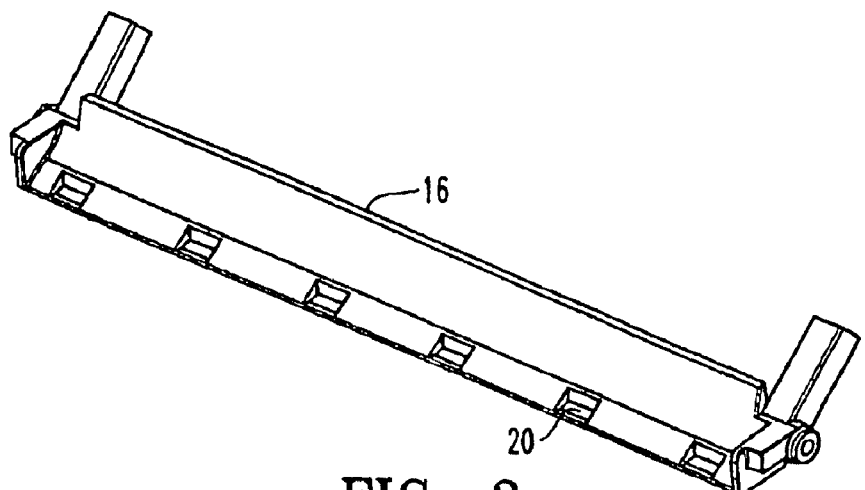
FIG. 3 is a perspective view of the top of a magnetic bed bar of one embodiment of the present invention.
Figure 4:
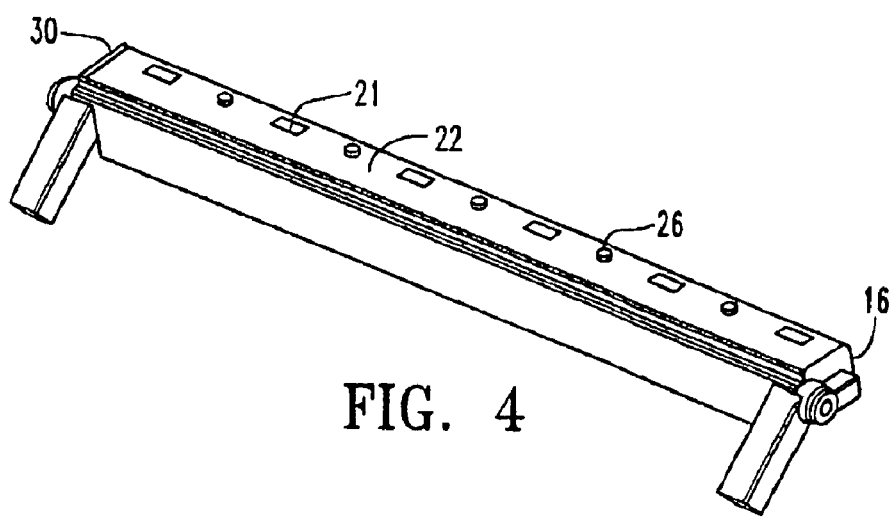
FIG. 4 is a is a perspective view of the bottom of the bed bar of FIG. 3.

FIGS. 3 and 4 illustrate an embodiment of a magnetic bed bar 16 of the invention. The illustrated bed bar 16 is configured to attach to the frame 4 of the prior art reel mower assembly of FIG. 1 in the same manner as the prior art bed bar 6, so that the magnetic bed bar 16 can be retro-fit to existing reel mower assemblies. The bed bar frame portion configuration is fairly widespread in various brands of existing reel mower assemblies, allowing for relatively simple modification of the magnetic bed bar such that same may be substituted for the existing bed bars.

As illustrated in FIGS. 3 and 4, a plurality of magnets 20 are mounted in a spaced apart relationship on the bed bar 16, and in the illustrated embodiment the magnets 20 are embedded in the bed bar 16 such that a lower face 21 thereof is substantially flush with the bottom surface 22 of the magnetic bed bar 16.

Figure 5:
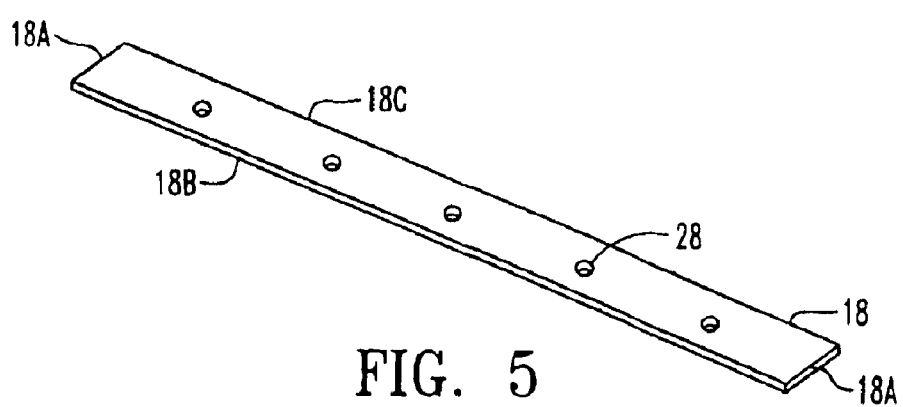
FIG. 5 is a perspective view of a bed knife for attachment to the magnetic bed bar of FIG. 3.
Figure 6:
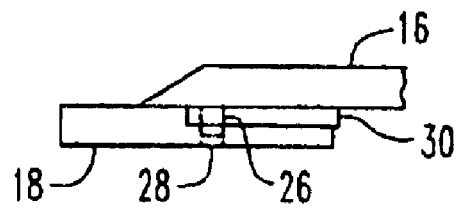
FIG. 6 is a schematic side view of the bed knife of FIG. 5 in the operating position on the magnetic bed bar of FIG. 3.

The bed knife 18, illustrated in FIG. 5, is magnetically held against the magnets 20 in an operating position as illustrated in FIG. 6 such that the bed knife 18 is oriented in cutting relationship with the reel 2 in the same fashion as the bed knife 8 of the prior art illustrated in FIG. 2.

Figure 7:
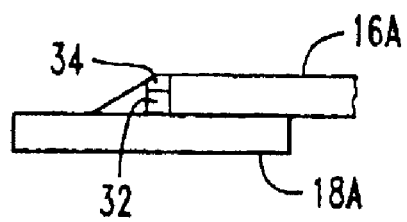
FIG. 7 is a schematic side view of an alternate bed knife and magnetic bed bar.

Engagement means are operative to prevent sliding movement of the bed knife 18 with respect to the magnets 20. In the illustrated embodiment the engagement means comprises a plurality of protrusions, illustrated as pegs 26, extending from the bed bar 16 into a corresponding recess, illustrated as a hole 28, in the bed knife 18. Conversely as illustrated in FIG. 7, the pegs 32 could extend up from the bed knife 18A into corresponding holes 34 in the bed knife 16A. Further engagement means are illustrated in FIG. 6 as a ridge 30 bearing against opposite end edges 18A and rear edge 18B of the bed knife 18.

While preventing sliding movement, the engagement means, illustrated as pegs 26 in holes 28, and as ridge 30, but also including other means, also allows the bed knife 18 to move away from the magnets 20 when a separating force is exerted on the bed knife 18 in a direction away from the magnets 20 that is greater than an attractive force exerted on the bed knife 18 by the magnets 20 when the bed knife 18 is in the operating position. While allowing the bed knife 18 to be easily removed by prying it away from the bed bar 16, this configuration also allows the bed knife to release from the bed bar 16 when an obstruction is encountered.

Figure 8:
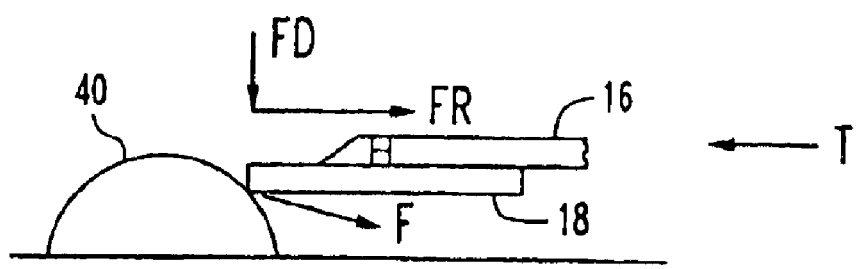
FIG. 8 is a side view of the bed bar of FIG. 7 contacting an obstruction and indicating the forces exerted on the bed knife to release it from the bed bar.

FIG. 8 illustrates schematically contact of the bed knife 18 moving in direction T with a typical obstruction ill as a partially buried stone 40. The contact causes a force F to be exerted on the bed knife 18. The major component of this force F is exerted rearward, as illustrated by the arrow FR, however there is also a smaller component FD exerted downward such that the bed knife 18 is pushed away from the bed bar 16 and the magnets 20. When this component of force FD exceeds the magnetic attractive force of the magnets 20 the bed knife 18 will release from the bed bar 16. In the prior art bed knife attached by screws, more damage would occur, since the bed knife would have to ride over the obstruction. Similarly where a stone or the like comes between the reel and the bed knife, a like force is exerted which can release the bed knife, reducing the possibility of severe damage to the reel which can be costly to repair.

The ridge 30 alone could provide satisfactory operation with a new bed knife 18, as same essentially forms a low pocket that closely fits the edges 18A, 18B of the bed knife 18. Sideways and rearward sliding movement with respect to the magnets 20 is thus prevented. It is however possible to make the bed knife 18 double edged such that the front and rear edges 18C, 181B are both cutting edges. The holes 28 and pegs 26 are oriented such that the bed knife 18 can be rotated bringing the rear cutting edge 18B to the front, thereby doubling the life of the bed knife 18. With such a double edged bed knife 18, the front edge becomes worn and rounded during use such that the ridge bears against a rounded edge that may slide over the ridge when rearward forces are applied. The pegs and holes are not affected by wear on the bed knife edges and will maintain the bed knife in position when it is rotated. The use of the ridge 30 in combination with the pegs 26 and holes 28 helps to align the bed knife with the pegs during installation.

The present invention could be practiced in a number of fashions including by manufacturing new reel cutting assemblies in accordance with the present invention, or alternatively, by producing a retrofit bed bar or support frame kit which would allow the magnetic blade attachment of the present invention to be implemented on an existing mower.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A reel mower assembly comprising:
    a mower reel rotatably mounted to a frame, and a drive operative to rotate the reel about a reel axis;
    at least one magnet mounted on the frame;
    a bed knife magnetically held against the magnet in an operating position such that the bed knife is oriented in cutting relationship with the reel; and
    engagement means operative to prevent sliding movement of the bed knife with respect to the magnet while allowing the bed knife to freely move away from the magnet when a separating force is exerted on the bed knife in a direction away from the magnet that is greater than an attractive force exerted on the bed knife by the magnet when the bed knife is in the operating position.

2. The assembly of claim 1 wherein the assembly comprises a plurality of magnets spaced along the frame.

3. The assembly of claim 1 wherein the engagement means comprises at least one protrusion extending from the frame into a corresponding recess in the bed knife.

4. The assembly of claim 1 wherein the engagement means comprises at least one protrusion extending from the bed knife into a corresponding recess in the frame.

5. The assembly of claim 1 wherein the engagement means comprises at least one ridge attached to the frame and bearing against an edge of the bed knife.

6. The assembly of claim 5 wherein the engagement means comprises a ridge bearing against each opposite end edge of the bed knife, and a ridge bearing against a rear edge of the bed knife.

7. The assembly of claim 1 wherein the frame further comprises a bed bar oriented substantially parallel to the reel axis, and wherein at least one magnet is attached to the bed bar.

8. The assembly of claim 7 wherein the engagement means is formed by the bed bar and bed knife.

9. An apparatus adapted for attachment to a reel mower assembly comprising a mower reel rotatably mounted to a frame and a drive operative to rotate the reel about a reel axis, the apparatus comprising:
    a bed bar adapted for attachment to the frame substantially parallel to the reel axis;
    a plurality of magnets mounted on the bed bar;
    a bed knife magnetically held against the magnets in an operating position such that the bed knife is oriented in cutting relationship with the reel when the bed bar is attached to the frame; and
    engagement means operative to prevent sliding movement of the bed knife with respect to the magnets while allowing the bed knife to freely move away from the magnets when a separating force is exerted on the bed knife in a direction away from the magnets that is greater than an attractive force exerted on the bed knife by the magnets when the bed knife is in the operating position.

10. The apparatus of claim 9 wherein the engagement means comprises at least one protrusion extending from the frame into a corresponding recess in the bed knife.

11. The assembly of claim 9 wherein the engagement means comprises at least one protrusion extending from the bed knife into a corresponding recess in the frame.

12. The apparatus of claim 9 wherein the engagement means comprises at least one ridge attached to the frame and bearing against an edge of the bed knife.

13. The apparatus of claim 12 wherein the engagement means comprises a ridge bearing against each opposite end edge of the bed knife, and a ridge bearing against a rear edge of the bed knife.

14. In a reel mower assembly comprising a mower reel rotatably mounted to a frame, and a drive operative to rotate the reel about a reel axis, a method of holding a bed knife in an operating position such that the bed knife is oriented in cutting relationship with the reel, the method comprising:
    mounting at least one magnet on the frame;
    magnetically holding the bed knife against the magnet in the operating position; and
    preventing sliding movement of the bed knife with respect to the magnet while allowing the bed knife to move freely away from the magnet when a separating force is exerted on the bed knife in a direction away from the magnet that is greater than an attractive force exerted on the bed knife by the magnet when the bed knife is in the operating position.

15. The method of claim 14 wherein sliding movement is prevented by providing at least one protrusion extending from the frame into a corresponding recess in the bed knife.

16. The method of claim 14 wherein sliding movement is prevented by providing at least one protrusion extending from the bed knife into a corresponding recess in the frame.

17. The method of claim 14 wherein sliding movement is prevented by providing at least one ridge attached to the frame and bearing against an edge of the bed knife.

18. The method of claim 17 wherein sliding movement is prevented by providing a ridge bearing against each opposite end edge of the bed knife, and a ridge bearing against a rear edge of the bed knife.

19. The method of claim 14 wherein the frame further comprises a bed bar oriented substantially parallel to the reel axis and below the reel axis, and wherein a plurality of magnets are attached to, and spaced along, the bed bar.

20. A reel mower assembly comprising:
a mower reel rotatably mounted to a frame, and a drive operative to rotate the reel about a reel axis;
at least one magnet mounted on the frame;
a bed knife magnetically held against the magnet in an operating position such that the bed knife is oriented in cutting relationship with the reel; and
engagement means operative to prevent sliding movement of the bed knife with respect to the magnet while allowing the bed knife to move away from the magnet when a separating force is exerted on the bed knife in a direction away from the magnet that is greater than an attractive force exerted on the bed knife by the magnet when the bed knife is in the operating position wherein the engagement means comprises at least one ridge attached to the frame and bearing against an edge of the bed knife.

21. The assembly of claim 20 wherein the engagement means comprises a ridge bearing against each opposite end edge of the bed knife, and a ridge bearing against a rear edge of the bed knife.

22. The assembly of claim 20 wherein the assembly comprises a plurality of magnets spaced along the frame.

23. The assembly of claim 20 wherein the engagement means comprises at least one protrusion extending from the frame into a corresponding recess in the bed knife.

24. The assembly of claim 20 wherein the frame further comprises a bed bar oriented substantially parallel to the reel axis, and wherein at least one magnet is attached to the bed bar.

25. The assembly of claim 24 wherein the engagement means is formed by the bed bar and bed knife.

26. An apparatus adapted for attachment to a reel mower assembly comprising a mower reel rotatably mounted to a frame and a drive operative to rotate the reel about a reel axis, the apparatus comprising:
a bed bar adapted for attachment to the frame substantially parallel to the reel axis;
a plurality of magnets mounted on the bed bar;
a bed knife magnetically held against the magnets in an operating position such that the bed knife is oriented in cutting relationship with the reel when the bed bar is attached to the frame; and
engagement means operative to prevent sliding movement of the bed knife with respect to the magnets while allowing the bed knife to move away from the magnets when a separating force is exerted on the bed knife in a direction away from the magnets that is greater than an attractive force exerted on the bed knife by the magnets when the bed knife is in the operating position, wherein the engagement means comprises at least one ridge attached to the frame and bearing against an edge of the bed knife.

27. The apparatus of claim 26 wherein the engagement means comprises a ridge bearing against each opposite end edge of the bed knife, and a ridge bearing against a rear edge of the bed knife.

28. The apparatus of claim 26 wherein the engagement means comprises at least one protrusion extending from the frame into a corresponding recess in the bed knife.

29. In a reel mower assembly comprising a mower reel rotatably mounted to a frame, and a drive operative to rotate the reel about a reel axis, a method of holding a bed knife in an operating position such that the bed knife is oriented in cutting relationship with the reel, the method comprising:
mounting at least one magnet on the frame;
magnetically holding the bed knife against the magnet in the operating position; and
preventing sliding movement of the bed knife with respect to the magnet while allowing the bed knife to move away from the magnet when a separating force is exerted on the bed knife in a direction away from the magnet that is greater than an attractive force exerted on the bed knife by the magnet when the bed knife is in the operating position, wherein sliding movement is prevented by providing at least one ridge attached to the frame and bearing against an edge of the bed knife.

30. The method of claim 29 wherein sliding movement is prevented by providing at least one protrusion extending from the frame into a corresponding recess in the bed knife.

31. The method of claim 29 wherein sliding sliding movement is prevented by providing at least one ridge attached to the frame and bearing against an edge of the bed knife.

32. The method of claim 31 wherein sliding movement is prevented by providing a ridge bearing against each opposite end edge of the bed knife, and a ridge bearing against a rear edge of the bed knife.

33. The method of claim 29 wherein the frame further comprises a bed bar oriented substantially parallel to the reel axis and below the reel axis, and wherein a plurality of magnets are attached to, and spaced along, the bed bar.

* * * * *

UNITED STATES PATENT AND TRADEMARK OFFICE
CERTIFICATE OF CORRECTION

PATENT NO. : 6,889,491 B2  Page 1 of 1
APPLICATION NO. : 10/201841
DATED : May 10, 2005
INVENTOR(S) : Jeffrey Buchko et al.

It is certified that error appears in the above-identified patent and that said Letters Patent is hereby corrected as shown below:

In the Specification:

Column 1, line 12, "caring" should be --tearing--.

Column 1, line 42, "assembly" should be --assemblies--.

Column 1, line 61, delete "is".

Column 2, line 25, "comprises" should be --comprise--.

Column 2, line 51, delete first occurrence of "is".

Column 3, line 51, delete second occurrence of "is a".

Column 4, line 56, "ill" should be --illustrated--.

Column 5, line 10, "181B" should be --18B--.

Column 5, line 17, "arc" should be --are--.

In the Claims:

Column 8, line 38, Claim 31, delete second occurrence of "sliding".

Signed and Sealed this

Third Day of April, 2007

JON W. DUDAS
*Director of the United States Patent and Trademark Office*